Nov. 28, 1950

J. O. SILVEY 2,532,263

HIGH-FREQUENCY COUPLING TRANSFORMER

Filed Nov. 16, 1948

Inventor:
John O. Silvey,
by Mellon & Morse
His Attorney.

Patented Nov. 28, 1950

2,532,263

UNITED STATES PATENT OFFICE 2,532,263

HIGH-FREQUENCY COUPLING TRANSFORMER

John O. Silvey, Bridgeport, Conn., assignor to General Electric Company, a corporation of New York Application November 16, 1948, Serial No. 60,257

8 Claims. (Cl. 250—40)

Figure 1:
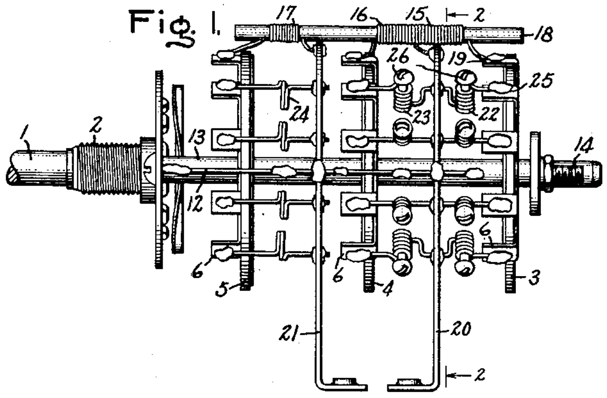

My invention relates to high frequency receivers, and particularly to receivers employing radio frequency transformers for coupling the individual stages of the receiver and arranged for the reception of a large number of pre-selected frequencies. It is a primary object of my invention to effect certain improvements in the transformer coupling arrangements of such receivers.

In television receivers it is desirable to have circuits pre-tuned to the separate television channels to be covered and to be able to connect the remaining circuits of the receiver to one of these circuits for the reception of the signals on that particular channel. Inasmuch as such circuits operate at relatively high frequency, varying from frequencies of the order of 40 megacycles or to more than 200 megacycles, it is also desirable to provide ground shields which are of low inductance and which effectively shield the individual circuits from each other. Such a ground shield is shown, for example, in an application of Benjamin J. Lawrence, Serial No. 719,353, filed December 31, 1946, and assigned to the assignee of the present invention, in which the radio frequency transformers of each channel are arranged as a series of coaxial coils having their axis parallel to the shaft of a switch used for connection to the coils of a selected channel, a ground shield being utilized as a support for the coil and as a low inductance ground path for the high frequency currents in the coils of the transformers. In such an arrangement it would be desirable to be able to tune the individual coils of the radio frequency transformer without regard to the inductive coupling between the coils. This would allow the primary and secondary coils of the transformer to be placed in any desired plane without regard to coupling therebetween and would facilitate the separate tuning of each individual coil.

It is an object of my invention to provide a new and improved high frequency transformer coupling arrangement for a television receiver.

It is another object of my invention to provide a new and improved multi-band switching arrangement for television receiver in which a simplified high frequency coupling transformer may be employed.

It is a further object of my invention to provide a new and improved fixed coupling circuit for the high frequency transformers of a television receiver.

In its broad aspect my invention consists in arranging the radio frequency transformer coils of the higher frequency television bands of a television receiver on opposite sides of a ground shield, the ground shield physically supporting one end of each coil. The inductance of the ground shield is so controlled by physical adjustment of the dimensions of the ground path that the ground shield presents the proper coupling impedance for the desired radio frequency band pass characteristic. Substantially the entire coupling between primary and secondary coils of the radio frequency transformer may be accomplished by virtue of the inductance in the ground shield which is interposed between the primary and secondary coils, thus allowing the primary and secondary coils to be tuned individually without a corresponding change in the coupling between the primary and secondary coils.

Figure 2:
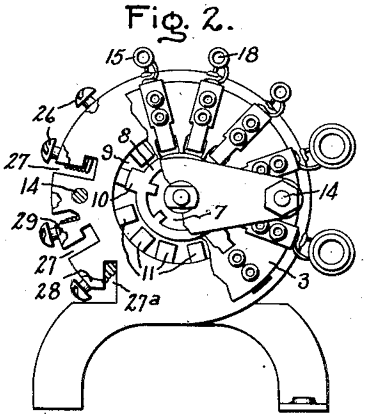
Figure 3:
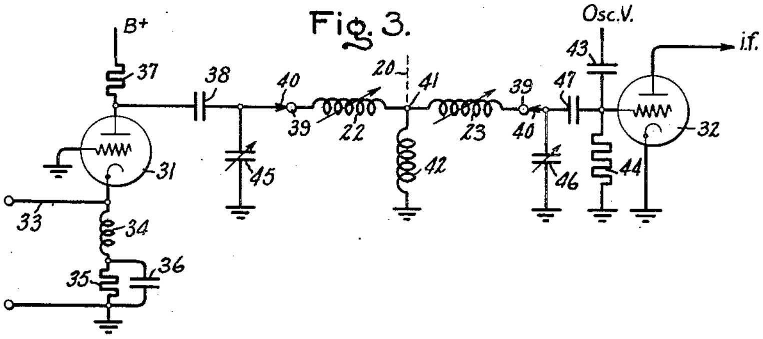

The novel features which are considered to be characteristic of my invention are set forth with particularity in the appended claims. My invention itself, however, both as to its organization and method of operation, together with further objects and advantages thereof, may best be understood by reference to the following description taken in connection with the accompanying drawings wherein Fig. 1 is a side elevation view of the high frequency transformer and switching arrangement of my invention; Fig. 2 is a sectional view of the arrangement of Fig. 1 taken along the line 2—2; and Fig. 3 is a portion of the high frequency circuits of a television receiver constructed in accordance with my invention.

Referring to the drawing, I have shown my high frequency transformer arrangement as embodied in a switching circuit for selecting the high frequency circuits of a desired channel of a television receiver. This switching arrangement comprises a horizontal shaft 1 which may be supported at one end by the bushing 2 which is secured to a panel of the receiver. The shaft 1 has a pair of bevelled sides to facilitate rotation of the three dielectric disks which form the rotors of switch wafers 3, 4 and 5. These switch wafers are of a conventional type having outwardly extending contact tabs 6 spaced about the periphery of the outer stationary disks of the individual wafers. It will be understood that the inner disk of each switch wafer comprises a dielectric portion 7 (best seen in Fig. 2) upon opposite faces of which are mounted metallic rings 8 of larger diameter than the dielectric portions, thus holding the dielectric portions inside the central aperture of the stator member 9. Each metallic ring has an outwardly extending contact finger 10 adapted to engage one of a plurality of resilient contacts 11 attached to the wafers 3, 4 and 5. The contacts 11 extend radially toward the outer circumference of the wafers 3, 4 and 5 and each is provided with a contact tab 6 to which is connected one end of a high frequency coil.

The stationary disk members of the switch wafers 3, 4 and 5 are substantially identical in construction and are so oriented that their connection to the respective high frequency coils is made by as short a lead as possible. These stationary disks are held in fixed spaced relation by means of tubular spacers 13 positioned between adjacent disks. The spacers 13, in turn, surround bolts 14 which are used to clamp the assembly.

For the high frequency circuits of the lower frequency channels of the television receiver, I provide axially aligned high frequency inductance coils comprising a radio frequency winding 15, a converter grid coil 16 and an oscillator coil 17, all being wound on a coil form 18. One end of the coil 15 is connected by soldering to a contact tab 19 on the wafer 3; one end of the coil 16 to a similar tab on the wafer 4; and one end of the coil 17 to a similar tab on wafer 5. In order to shield the various sections of the switch which carry high frequency current to minimize undesired inductive coupling between the respective elements of the switch I provide a first metallic shield plate 20 which is positioned between the wafers 3, 4 and a second metallic shield plate 21 which is positioned between wafers 4, 5. The opposite ends of the coils 15, 16 are secured by soldering in notches (not shown) in the periphery of the metallic plate 20 and the opposite end of coil 17 is secured by soldering in a notch on the periphery of metallic plate 21. The lower end of plates 20, 21 are provided with inwardly bent portions which serve as feet and are mechanically and electrically connected to the metal chassis of the receiver. To bond the individual spacers 13 to the ground plates 20, 21 I provide a wire 12 which is soldered to each spacer and to both metallic ground plates 20, 21.

For the high frequency circuits of the higher frequency channels, specifically illustrated as the four highest frequency channels of the television receiver I provide high frequency inductance coils comprising a radio frequency winding 22, a converter grid coil 23 and an oscillator coil 24 These coils are of the type which are pre-formed about a mandrel of the desired diameter and are then removed and connected in the circuit suspended by the coil ends. One end of the coil 22 is connected by soldering to a contact tab 25 on the wafer 3; one end of coil 23 to a similar tab on wafer 4; and one end of coil 24 to a similar tab on wafer 5. It will be understood that coils 22 and 23 form the primary and secondary windings respectively of a radio frequency transformer which couples radio frequency energy from the radio frequency stage of the television receiver to the oscillator-converter stage thereof. Coils 22, 23 are individually tuned by means of brass screws 26 which threadingly engage the inner surface of the coils. The pitch of screws 26 is preferably equal to the pitch of coils 22, 23 so that the screws may be easily threaded into the interior of the coils.

It is apparent from the drawing that the radio frequency coils 22, 23 are not in coaxial alignment and in fact are shielded from each other by the metallic ground plate 20. To provide the necessary coupling between the primary coils 22 and the secondary coils 23 I control the inductance of the ground plate 20 by forming notches 27 therein, which are best illustrated in Fig. 2, of generally L-shaped configuration extending inwardly from the periphery of the plate. The dimensions of notches 27 are of such value that the inductance of the ground path between the solder connection point of the coils 22, 23 and the chassis of the receiver is of the proper value to provide the desired coupling between the coils 22, 23. Thus the inductance of plate 20 between the connection or solder point 28 and the receiver chassis is controlled by notch 27*a* to provide the proper value of inductance for coupling at the highest television channel. The inductance of plate 20 between a similar solder point 29 and the receiver chassis is of the proper value for coupling at the next lower television channel, and so forth. It can be seen from the drawing that the windings for the various channels are arranged in circular fashion about the metallic ground plates 20, 21. These windings, of course, vary in size and number of turns, beginning with the highest frequency winding shown at the lower left-hand portion of Fig. 2 and progressing in a clockwise direction to the lowest frequency winding shown at the lower right-hand portion of Fig. 2.

In Fig. 3 I have shown the circuit diagram of the high frequency portion of a television receiver which comprises a radio frequency amplifier employing an electron discharge device 31 and a converter-oscillator electron discharge device 32. Input signals, as from an antenna and the usual lead-in conductors (not shown), are supplied to the cathode of the radio frequency amplifier 31 by means of a conductor 33. Amplifier 31 has its control electrode connected to ground and its cathode connected to ground through a series circuit comprising an inductance 34 and a resistor 35 shunted by a capacitor 36, inductance 34 functioning to prevent the radio frequency signals from being attenuated. The anode of the radio frequency amplifier 31 is supplied with operating potential from a suitable source, indicated by the legend B+ through an anode resistor 37. The anode likewise is coupled through a capacitor 38 to the radio frequency winding 22. The high potential end of the winding 22 is shown as being connected to a fixed contact 39 which, in turn, is engaged by the movable finger or contact 40. These contacts, of course, are those carried by switch wafer 3. The low potential end of the winding 22 is connected to the ground plate 20 at a connection point represented by the numeral 41. The inductance of the shield plate 20 between solder point 41 and the chassis of the receiver is indicated at 42.

The ground terminal of secondary coil 23 is connected to solder point 41 and the other terminal thereof is connected through contacts 39, 40 of switch wafer 4 to the control electrode of device 32 through a capacitor 47. The cathode of device 32 is connected to ground and oscillator voltage is fed to the control electrode of this device through coupling capacitor 43. A leak resistor 44 is provided between the control electrode of device 32 and ground. Variable capacitors 45 and 46 are provided across the primary and secondary circuits respectively to provide adjustment of the resonant frequency thereof so that devices 31, 32 of different output and input capacities may be utilized.

It will be understood that each of the four highest frequency channels of my television receiver employes respective coils 22, 23 and the inductance 42 presented by the shield plate 20 is controlled by means of notches 27 to a value which gives the required degree of coupling necessary for the over coupled circuits conventionally employed in wide band amplifiers. The inductances 22, 23, together with shield inductance 42, form a coupled circuit of the type known as a direct inductive coupled circuit. It will be appreciated that the band pass characteristics obtainable with a direct inductively coupled network is of the same general character as those obtainable with circuits employing mutually inductive coupling. With direct inductive coupling the same equations of band pass characteristics, selectivity, etc. apply without change if the coupled inductance 42 is substituted for the mutual inductance between coils which appears in the mutual inductive coupled equations.

An important advantage of my television circuit is that by employing such a direct inductive coupling network the critical tuning adjustments necessary in the conventional coupled circuit using mutual inductance coupling are obviated. The primary and secondary coils 22, 23 may be placed in any plane whatsoever without regard to the axis of each coil as there is no need for inductive coupling between these coils, this coupling being obtained by means of the fixed inductance 42. Likewise the individual coils 22 and 23 may be tuned without regard to changes in the spacing between coils which eliminates the troublesome variable of coupling between primary and secondary coils. The effect, therefore, is to obtain isolated primary and secondary circuits which may be easily adjusted by semi-skilled personnel on the production line.

While I have shown my invention as applied to the four highest frequency channels of the television receiver, it is obvious that the principles of my invention may be utilized to provide any number of direct inductive coupled channels.

While the invention has been described by reference to a particular embodiment thereof, it will be understood that numerous modifications may be made by those skilled in the art without departing from the invention. I therefore aim in the appended claims to cover all such equivalent variations as come within the true spirit and scope of my invention.

What I claim as new and desire to secure by Letters Patent in the United States is:

1. In a high frequency receiver having a chassis and a plurality of high frequency circuits the combination comprising a metallic plate connected to and supported by said chassis, a high frequency coupling transformer comprising a primary coil and a secondary coil, said coils being disposed on opposite sides of said plate and each having one terminal connected to said plate at a point thereon, said coils being electromagnetically shielded from each other by said plate and having negligible mutual inductance therebetween, said plate being slotted so as to provide a coupling impedance for transferring energy between said primary and secondary coils, the other terminals of said primary and secondary coils being connected in operative circuit relation to said high frequency circuits.

2. In a high frequency receiver having a chassis and a plurality of high frequency circuits, the combination comprising a metallic plate connected to and supported by said chassis, a high frequency coupling transformer comprising a primary coil and a secondary coil, said coils being disposed on opposite sides of said plate and each having one terminal connected to said plate at a point thereon, said coils being electromagnetically shielded from each other by said plate and having negligible mutual inductance therebebetween, said plate being notched between said connecting point and said chassis so as to provide an inductive coupling impedance for transferring energy between said primary and secondary coils, the other terminals of said primary and secondary coils being connected in operative circuit relation to said high frequency circuits.

3. In a high frequency receiver having a chassis and a plurality of high frequency circuits, the combination of a metallic plate connected to and supported by said chassis, a high frequency transformer comprising a primary winding and a secondary winding which are tuned to a predetermined frequency, said windings being disposed on opposite sides of said plate and each having one terminal connected to said plate at a point thereon, said coils being electromagnetically shielded from each other by said plate and having negligible mutual inductance therebetween, said plate being notched adjacent said point so as to provide a coupling inductance at said predetermined frequency, whereby the energy transfer between said primary and secondary windings occurs substantially by direct inductive coupling through said coupling inductance, the other terminals of said primary and secondary windings being connected in operative circuit relation to said high frequency circuits.

4. In a high frequency transformer, a primary coil and secondary coil, both of said coils being tuned to a predetermined frequency by the circuit capacities associated therewith, means for coupling energy from said primary coil to said secondary coil comprising a metallic plate interposed between said inductances, said plate forming an electrical shield between and physical support for said coils, one end of each coil being connected to a point on said plate near its edge, said points lying on opposite sides of said plate, said coils having negligible mutual inductance therebetween, said plate being cut away to provide a non-linear notch extending inwardly from said edge adjacent said points and then extending angularly under said points, whereby said plate has an inductance sufficient to provide a desired coupling impedance between said first and second inductances at said predetermined frequency.

5. In a high frequency transformer, a primary coil and a secondary coil, both of said coils being tuned to a predetermined frequency, means for inductively coupling energy from said primary coil to said secondary coil comprising a metallic plate interposed between said coils and forming a support for one end of each of said coils, said coils having their axes substantially parallel to the plane of said plate and having negligible mutual coupling therebetween, said plate being notched adjacent the points of connection to said coils to provide a substantial inductive impedance at said frequency, the inductance of said plate being of a value sufficient to provide a coupling impedance between said first and second inductances at said predetermined frequency.

6. A high frequency transmission network comprising a first inductance coil, a second inductance coil, said inductance coils being tuned to a predetermined frequency, means for inductively coupling energy between said first and second inductance coils comprising a grounded shield plate interposed between said coils and supporting one end thereof at points near its edge on opposite sides thereof, said shield plate having a hook-shaped slot extending inwardly from said edge adjacent said points, said shield plate providing a fixed inductive coupling impedance between said inductance coils at said predetermined frequency.

7. In a high frequency receiver having a chassis and a plurality of high frequency circuits, the combination comprising a metallic plate connected to and supported by said chassis, a plurality of high frequency coil assemblies arranged around the periphery of said plate, each of said assemblies comprising a primary coil and a secondary coil located on opposite sides of said plate, said coils being electromagnetically shielded from each other by said plate and having negligible mutual inductance therebetween, the coils of each assembly being tuned to a predetermined frequency and each having one terminal connected to said plate at a corresponding point thereon near said periphery, said plate having a non-linear slot extending inwardly from said periphery near said point and then extending transversely between said point and said chassis, thereby to define a hook-shaped plate section having said points located near its free end, said plate being so dimensioned between said connection point and said chassis as to provide a coupling impedance for transferring energy between said primary and secondary coils at said predetermined frequency, and switching means disposed on opposite sides of said plate for selectively connecting the other terminals of the coils of respective ones of said assemblies into operative circuit connection with said high frequency circuits.

8. In a high frequency receiver having a chassis and a plurality of high frequency circuits, the combination comprising a metallic plate connected to and supported by said chassis, a plurality of high frequency coil assemblies arranged around the periphery of said plate, each of said assemblies comprising a primary and a secondary coil located on opposite sides of said plate, said coils being electromagnetically shielded from each other by said plate and having negligible mutual inductance therebetween, the coils of each assembly being tuned to a predetermined frequency and each having one terminal connected to said plate at a corresponding point thereon, said plate having spaced elongate notches extending inwardly from the periphery thereof and adjacent the connection points of said assemblies, the remaining adjacent portions of said plate having substantial inductive reactance at said frequency, whereby said plate acts as a coupling impedance for transferring energy between said primary and secondary coils at said predetermined frequency, and switching means disposed on opposite sides of said plate for selectively connecting the other terminals of the coils of respective ones of said assemblies into operative circuit connection with said high frequency circuits.

JOHN O. SILVEY.

REFERENCES CITED

The following references are of record in the file of this patent:

UNITED STATES PATENTS

| Number | Name | Date |
|---|---|---|
| 1,951,542 | Bradley | Mar. 20, 1934 |
| 2,115,694 | Braden | Apr. 26, 1938 |
| 2,221,105 | Otto | Nov. 12, 1940 |
| 2,266,525 | Wendt et al. | Dec. 16, 1941 |

FOREIGN PATENTS

| Number | Country | Date |
|---|---|---|
| 758,898 | France | Jan. 24, 1934 |